United States Patent [19]

Wessel

[11] 3,889,159

[45] June 10, 1975

[54] METHOD AND SYSTEM TO PROTECT ELECTRONIC SWITCHING COMPONENTS

[75] Inventor: Wolf Wessel, Schwieberdingen, Germany

[73] Assignee: Robert Bosch G.m.b.H., Gerlingen-Schillerhoehe, Germany

[22] Filed: Jan. 16, 1974

[21] Appl. No.: 433,732

[30] Foreign Application Priority Data

Mar. 2, 1973 Germany .......................... 2310448

[52] U.S. Cl. ................................ 317/31; 317/33 R

[51] Int. Cl. ........................................ H02h 3/20

[58] Field of Search .............. 317/31, 33 R, 33 VR; 323/9

[56] References Cited

UNITED STATES PATENTS 3,122,697 2/1964 Kauders ........................ 317/33 VR 3,480,834 11/1969 Billings ................................ 317/31

3,665,253 5/1972 Stefani ............................. 317/31 X

*Primary Examiner*—James D. Trammell

*Attorney, Agent, or Firm*—Flynn & Frishauf

[57] ABSTRACT

To protect electronic switching elements against short circuits in loads connected in series therewith, particularly switching transistors and the like, a momentary test pulse is generated upon connection of the load to a live circuit. The test pulse is connected to the switch in a direction to close the switch, and the voltage appearing at the switch is then tested, the switch being blocked immediately if the voltage appearing thereat is not within a permissible voltage range resulting in normal current flow through the switch, the switch permitting to remain conductive, or closed, if the sensed voltage at the connected switch terminal is within design values.

21 Claims, 2 Drawing Figures

METHOD AND SYSTEM TO PROTECT ELECTRONIC SWITCHING COMPONENTS

Figure 1:
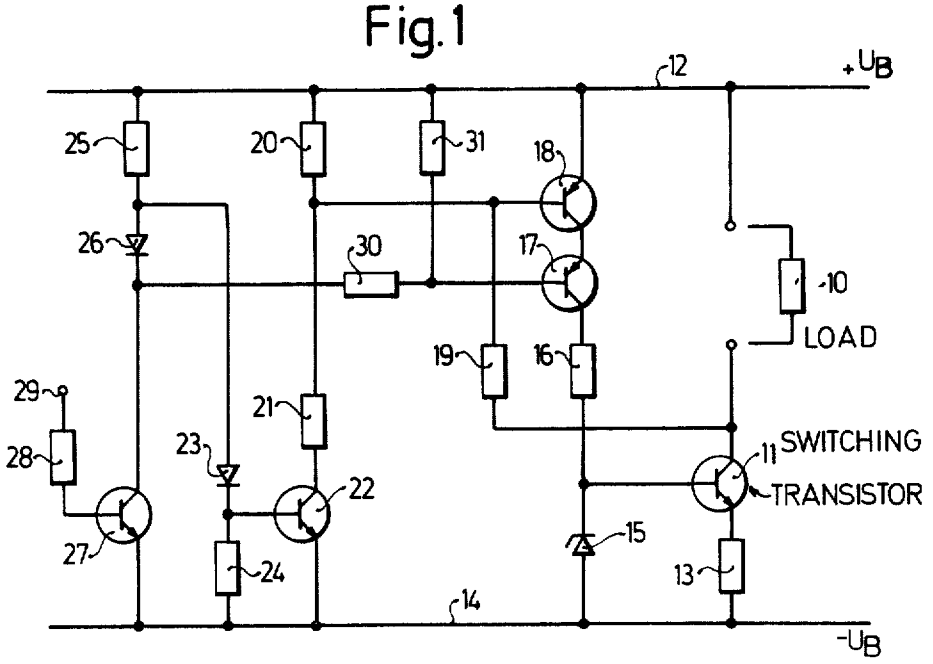

The present invention relates to a method and to a system to protect electronic switching elements, particularly switching transistors and the like, which elements may be damaged upon occurrence of a short circuit in the load connected in series with the switch.

Many types of loads, such as resistors, relays, and the like are controlled by electronic switches, particularly by switching transistors. The switching transistors are so connected that their emitter-collector paths are connected in series with the load. If the electric load is short-circuited, due to malfunction, an error in connection, or the like, current can flow over the electronic switch which is so high that the switch will be unduly heated and destroyed.

It has previously been proposed to protect electronic switches by including a current-limiting resistor in series therewith. The current-limiting resistor can then limit the total current flowing through the electronic element and the short-circuited load to a permissible value. The current-limiting resistor carries current also during short-circuited load connection, thus wastes energy, and generates heat which must be removed. The overall arrangement including the current-limiting resistor is, therefore, inefficient in operation.

It is an object of the present invention to provide a method, and a system to immediately disconnect a switching transistor if the switched circuit would have an excessive amount of current flowing therethrough, so that no current can flow over the switching path of the semiconductor element, typically a switching transistor. The method and system, further, determine before the load is connected if the load is short-circuited or not.

Subject Matter of the Present Invention

Briefly, a momentary testing pulse, or scanning pulse is generated before the load is to be connected; the test pulse closes the switch; upon closing of the switch, the voltage at the junction point between the switch and the load is determined, and the switch is then either held in current-conductive, closed condition or will immediately block current flow, that is, will open if the voltage at the junction should indicate that the load is short circuited.

The test pulse can be generated as the load is connected by utilizing the storage time of electronic components in an electronic circuit.

In accordance with a feature of the invention, the control electrode of the electronic switch, typically a switching transistor, is connected to a series circuit including the switching circuits of two control transistors; one of the two control transistors is commanded to change conductive state controlled by the test command signal, and the second transistor is controlled between conduction, and non-conduction in dependence on the voltage level at the junction between the switch and the load. In effect, therefore, the two control transistors form an AND-gate.

The circuit arrangement in accordance with the present invention is simple, can be constructed in the form of integrated circuits, and is particularly adapted for the rough operating conditions when applied to a motor vehicle. The switch, the switching method, and the supervisory switching circuit is particularly adapted for use in supervising loads in automotive vehicles.

Figure 2:
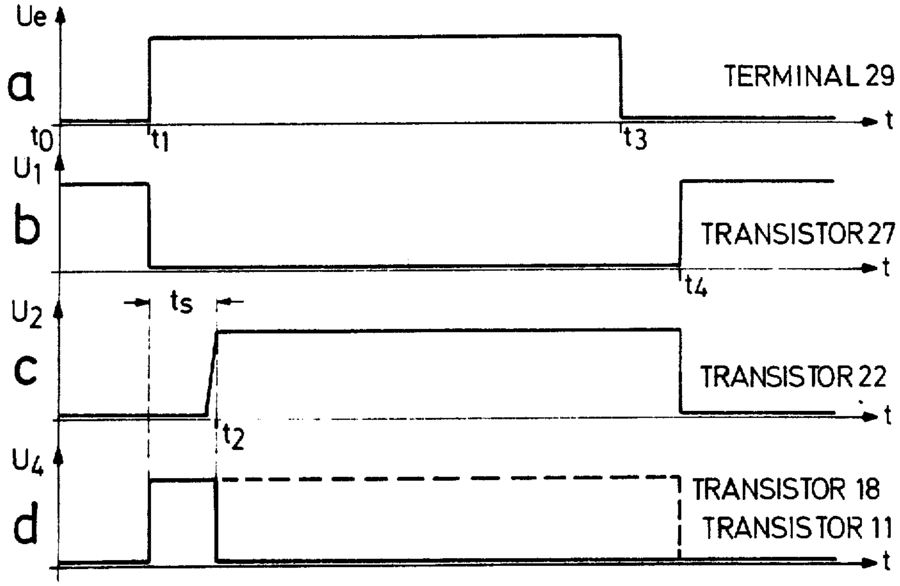

The invention will be described by way of examples with reference to the accompanying drawings, wherein:

FIG. 1 is a general schematic circuit diagram of the switch protective system in accordance with the present invention;

and FIG. 2 is a timing diagram illustrating the voltage levels, with respect to time, within selected components of the circuit of FIG. 1.

A load 10 is connected in series with the emitter-collector path, that is, the switching path of a switching transistor 11. The load 10 is schematically indicated as an ohmic resistor, but may be any type of a load. It is connected between a pair of supply buses 12, 14 of, for example, 12 V. The emitter of the transistor 11 is connected over emitter-resistor 13 to the common supply line 14. The base of the switching transistor 11 is connected over a resistor 16 with the series circuit formed of two transistors 17, 18, which form an AND-gate. The collector of the first transistor 17 is connected to resistor 16, the emitter of the second transistor 17 is connected to the collector of the second transistor 18. The emitter of the second control transistor 18 is connected to the common supply bus 12. The collector of switching transistor 11 is connected over a resistor 19 with the base of the second control transistor 18. The second control transistor 18 has two resistors 20, 21 connected to the base thereof which, together with an intermediate transistor 22, form a voltage divider. Transistor 22 has its emitter connected to bus 14, its collector to resistor 21; resistor 20 is connected to positive bus 12. The second control transistor 18, together with resistors 19, 21, forms an OR-gate. The base of the transistor 22 is connected with the cathode of a diode 23 and a resistor 24, the other terminal of which connects to negative bus 14. The anode of diode 23 is connected with a resistor 25 which is connected to a common positive bus 12. The anode of diode 23 is further connected to the anode of diode 26, the cathod of which is connected to the collector of an input transistor 27. The emitter of input transistor 27 is connected to the common supply bus 14; the base of the input transistor 27 is connected over an input resistor 28 with input terminal 29. The collector of input transistor 27 is connected over resistor 30 with the base of the first control transistor 17. The base of the first control transistor 17 is additionally connected to the positive supply bus 12 by a resistor 31.

Operation, with reference to the timing diagram of FIG. 2: Let it be assumed, first, that the input terminal 29 at time period $t_0$ has an input voltage $U_e$ = 0 V connected thereto. Input transistor 27 is blocked. As will appear, switching transistor 11 is also blocked and, in effect, the switch is open, and the load 10 disconnected. Resistor 25 and diode 23 hold the connecting transistor 22 in conductive condition. Connecting transistor 22 is operated in the saturation region. As a result, the base of the transistor 22 has a substantially higher base current applied thereto than that which would be necessary to change over the connecting transistor 22 into conductive condition. Operating the connecting transistor 22 highly in saturation has the effect that, upon change-over of the connecting transistor 22 into blocked or non-conductive condition upon change of an input signal applied thereto, the output signal of transistor 22 will not change immediately, but only after a certain storage time has elapsed.

Let it be assured that the switch is to close at $t_1$. Input voltage $U_e$ becomes positive. This positive voltage is applied, for example, by switching connection of terminal 29 to a positive voltage derived, for example, from positive bus 12. This turn-ON pulse changes the condition of conduction of input transistor 27, so that transistor 27 will become conductive and the voltage drop across the switching path of input transistor 27 will become effectively ZERO. No more base current can flow over diode 23 to the coupling transistor 22. As will appear, transistor 11 will become conductive but only if load 10 does not have a short circuit.

Reverting again to the condition under which terminal 29 is de-energized, that is, before switching-ON, connecting transistor 22 is in highly saturated conduction. Upon conduction of transistor 22, the second control transistor 18 is rendered conductive over resistor 21. The first control transistor is blocked, due to the blocked input transistor, and the likewise blocked diode 26. If the first control transistor 17 is blocked, the series connection of the control transistors 17, 18, which are connected as an AND-gate, prevents current flow over resistor 16 to the base of the switching transistor 11, since the AND-gate is likewise blocked. Thus, switching transistor 11 is blocked.

When the input voltage $U_e$ becomes positive, and diode 23 will no longer supply base current to the connecting transistor 22, it will tend to change over. During the storage time $t_s$, however, the connecting transistor 22 will remain conductive, that is, until time $t_2$. The conductive input transistor 27 controls the first control transistor 17 to become conductive. The second control transistor 18 continues to be conductive at least until the period of time $t_2$, due to the storage effect $t_s$ of the connecting transistor 22, and the transfer of the signal over resistor 21. The series circuit of the transistors 17, 18 is, therefore, conductive in the time interval between $t_1$ and $t_2$, that is, during the time $t_s$. The difference pulse, illustrated in FIG. 2, graph d, controls, over resistor 16, switching transistor 11 to become conductive for the period of time $t_s$.

If the load 10 is not short-circuited, that is, provides a predetermined design voltage drop, the collector of transistor 11 will have a voltage appear thereat which is approximately equal to that of the common supply line 14, that is, $-U_B$. Resistor 19 can, then, supply base current to the second control transistor 18 and even if the connecting transistor 22 blocks after the storage time $t_s$, no current can flow over resistor 21 to the second control transistor 28. The second control transistor 18 is, then, held in conductive condition by the resistor 19. The first control transistor 17 is held in conductive condition over resistor 13 and input transistor 27, so that base current can continue to flow over resistor 16 to the switching transistor 11, holding switching transistor 11 in connected condition, and supplying current to the load 10. If the input voltage $U_e$ drops to zero, for example at time $t_3$, the input transistor 27 will block after a certain delay time has elapsed, as indicated by time $t_4$. The first control transistor 17 will then block immediately, the base current to switching transistor 11 is interrupted and it will block until, again, voltage is applied to the input terminal 29 which signals that the load 10 is again to be connected.

If there should be malfunction, for example if the load 10 is short-circuited, the same sequence will occur until time $t_2$. During the time $t_1$ to $t_2$, however, the voltage at the collector of switching transistor 11 cannot go in the direction of the supply voltage $-U_B$, but rather, upon short-circuited load, the voltage will be approximately at the level of the positive bus 12. Resistor 19 can, therefore, not supply base current to the second control transistor 18 and, after the storage time $t_s$ of the connecting transistor 22, the second control transistor will no longer receive base current and will block. The series circuit of the first control transistor 17 and the second control transistor 18, both together, will therefore block.

The voltage $U_4$, FIG. 2, graph *d*, appears only as a difference pulse. The switching transistor 11 is rendered conductive only during the duration of this short-time pulse and again blocks at time $t_2$. The short circuit current flowing during the duration of this short pulse during time $t_s$ is limited, itself, due to the very small current amplification of the switching transistor 11 or, as indicated in FIG. 1, by a special limiting circuit formed by the emitter-resistor 13 and Zener diode 15. The high pulse current passed by the transistor 11 has only very limited duration and can be accepted by the transistor, due to its inherent capacity. The single pulse heat dissipation characteristics of transistors are much greater than the continuous heating losses which can be tolerated during operation.

The switching transistor 11 need not dissipate substantial amount of heat, which is usually the case in current-limiting circuits, thus avoiding the necessity for special cooling or heat dissipating arrangements.

If a short circuit arises in the load 10 during operation, the collector of transistor 11 has the positive voltage $+U_B$ applied thereto. During operation, also, the second control 'ransistor 18 will then immediately block and disconnect the switching transistor 11 due to interruption of the base current thereto.

In FIG. 2, graph a illustrates the pulse applied to terminal 29, graph *b* the switching of transistor 27, graph *c* the switching of transistor 22 and graph *d*, in full lines, the base current applied to transistor 18, when the load is short-circuited, and in dashed lines the extension when the load is operating properly. The current flow through transistor 11 will be identical. The time $t_s$ during which the switching transistor 11 conducts the short circuit current can be extremely short. It is self-limiting since transistor 22 is already turned off, the time arising merely due to the storage effect inherent in the transistor itself. The time $t_s$ may be in the order of 1 microsecond.

Various changes and modifications may be made within the scope of the inventive concept.

The resistor 13, in circuit at all times, should have a low value so that the heat dissipation thereof is a minimum. The value of the resistor 13 is not critical and will depend on the nature of the switching element 11, voltage supply, tolerated heat dissipation, use, efficiency requirements.

I claim:

1. Method of protecting an electronic semiconductor switching element (11) against short circuits in a load (10) connected in series therewith, comprising generating a test pulse upon connection of the load (10);

connecting said test pulse to the switching element

(11) to render said switching element conductive; testing the voltage at the junction of the switching element (11) and the load (10) and blocking the switching element (11), or permitting the switching element to remain conductive, in dependence on the level of the sensed test pulse.

2. Method according to claim 1, further comprising the step of commanding, by logic connection, the sequence of the steps set forth in claim 1.

3. Method according to claim 1, wherein the step of generating the test pulse comprises driving a semiconductor device heavily into saturation to provide, upon turn-off of said device, a time delay;

wherein the step of connecting the test pulse to the switching element (11) comprises connecting said test pulse both to said semiconductor device and to said semiconductor switching element, to close the switch during the re-combination time period of the semiconductor device.

4. Protective circuit for a semiconductor switching element (11) to protect the element against short circuits in a load (10) connected in series therewith, and to an energized source of supply (12, 14) comprising means (20, 21, 22) generating a momentary test pulse upon connection of the load (10) to the energized source of supply;

means (21) connecting said test pulse to the switching element (11) and controlling said switching element (11) to become conductive to thereby connect the load (10), and the conductive switching element in series therewith, to the energized source of supply;

means (19, 20, 18) sensing the voltage at the junction of the switching element (11) upon conduction of the switching element;

and means (16, 17, 18) controlling continued conduction of the switching element (11) upon termination of the test pulse in accordance with sensed voltage at the junction of the switching element (11) and the load (10).

5. Circuit according to claim 4, wherein said control means includes an AND-gate (17, 18) to render said switching element conductive if both inputs to said AND-gate are energized;

and an OR-gate (18, 19, 21) connected to render one of the inputs of the AND-gate conductive if: (a) said sensing means senses a voltage at the junction of the switching element and the load indicative of a predetermined voltage drop across the load; or (b) said test pulse persists.

6. Circuit according to claim 5, wherein the AND-gate comprises two switching transistors (17, 18) having their emitter-collector paths connected in series, the output of the AND-gate controlling conduction of said switching element;

the inputs to said AND-gates comprising connections to the bases of said switching transistors, one of said switching transistors (17) being controlled by an ON-OFF signal commanding connection, or disconnection of the switching element and the second switching transistor (18) being controlled by said OR-gate.

7. Circuit according to claim 6, wherein the OR-gate includes a connecting transistor (22), an input transistor (27) is provided, said input transistor controlling the conductive state of said connecting transistor.

8. Circuit according to claim 7, wherein the input transistor (27) controls conduction of said first switching transistor (17) in dependence on the presence, or absence of the ON-OFF command signal.

9. Circuit according to claim 7, wherein the connecting transistor (22) is connected to the input transistor to be conductive when the input transistor has an OFF-command signal applied thereto, and means (20, 21) connecting said transistor in circuit with the source of supply to conduct heavily in the saturated region;

said input transistor (27) being connected to said connecting transistor to tend to render said connecting transistor non-conductive upon having an ON-command signal applied thereto, the time delay between actual turn-off of the connecting transistor and the blocking signal derived from said input transistor forming said test pulse.

10. Circuit according to claim 4, further comprising a Zener diode (15) connected in parallel to the switching path of said switching element (11).

11. Circuit according to claim 4, further comprising a current-limiting resistor (13) in series connection with the main current switching path of the switching element (11).

12. Circuit according to claim 11, wherein the value of said current-limiting resistor (13) is small with respect to the internal resistance of the load (10) to be connected to the switching element (11).

13. Circuit according to claim 6, wherein the means sensing the voltage at the junction of the switching element and the load comprises a resistor (19) connecting said junction with the base of the other of said switching transistors included in the AND-gate.

14. Circuit according to claim 8, further comprising a diode (26) connected in series with the switching path of the input transistor (27), and a coupling resistor (30) connecting the junction of said diode and said switching transistor to the control electrode of the first switching transistor (17) included in said AND-gate.

15. Circuit according to claim 14, further comprising resistance means connected between the source of supply (12) and said diode, the junction between said resistance means and the diode being coupled (23) to the coupling transistor (22).

16. Circuit according to claim 14, further comprising a second diode (26) coupling the diode (26) to the base of the connecting transistor (22), and a resistor (24) connecting the base to the other terminal of the source of supply to form a base voltage divider for the coupling transistor (22).

17. Circuit according to claim 9, further comprising a coupling resistor (21) connecting the output of said coupling transistor (22) to the control electrode of the second switching transistor (18) included in said AND-gate, and forming one input of the OR-gate thereto.

18. Circuit according to claim 6, further comprising resistance means (16) connected in series with the switching paths of said switching transistors (17, 18) included in said AND-gate, a Zener diode (15) connected in series with said resistance means (16);

and a connection from the junction of said Zener diode (15) and said resistance means (16) to the control terminal of said switching element (11) and forming said means controlling the conduction of the transistor.

19. Circuit according to claim 4, wherein said means generating the test pulse upon connection of the circuit to the load comprises a connecting transistor (22) connected to be normally conductive in heavily saturated condition, and an input transistor (27) changing state upon command of an input signal (29), the recombination time delay of said heavily conducting connecting transistor (27) after change-of-state of said input transistor, upon having a signal applied thereto, providing said test pulse;

the connecting means connecting said test pulse to said switching element comprising an AND-gate (17, 18) rendered conductive upon occurrence a. an input command signal rendering said semiconductor switching element (11) conductive to turn the circuits ON, and b.

i. persistance of said test pulse during the recombination time period of said connecting transistor (22) or ii. sensing of voltage at the junction of the switching element and the load indicative of proper internal resistance of the load by said sensing means.

20. Circuit according to claim 4 wherein the time duration of the test pulse is in the order of the short-time maximum current of the switching element (11).

21. Circuit according to claim 20 wherein said time duration is in the order of one microsecond.

* * * * *